United States Patent Office 2,882,936
Patented Apr. 21, 1959

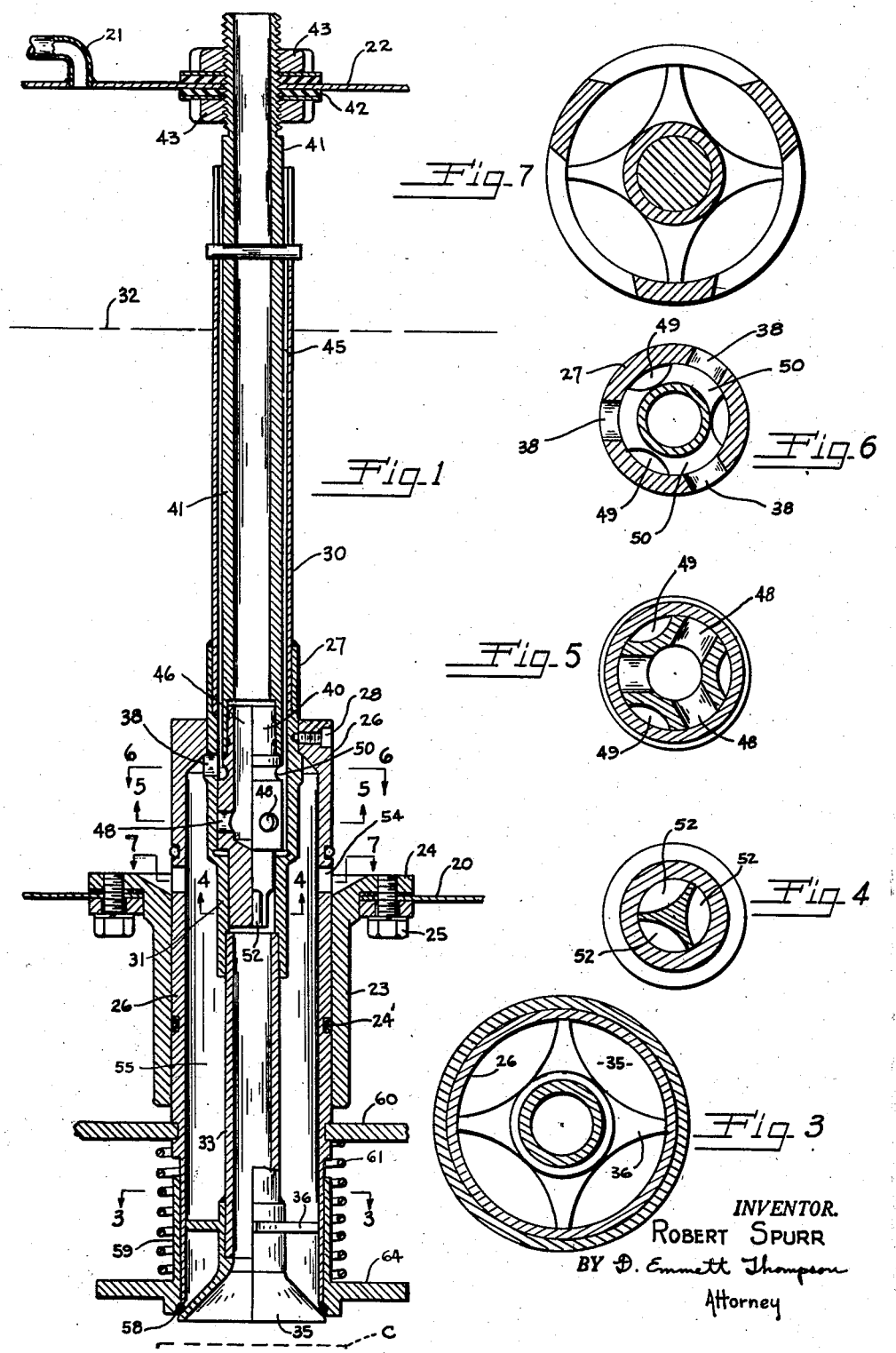

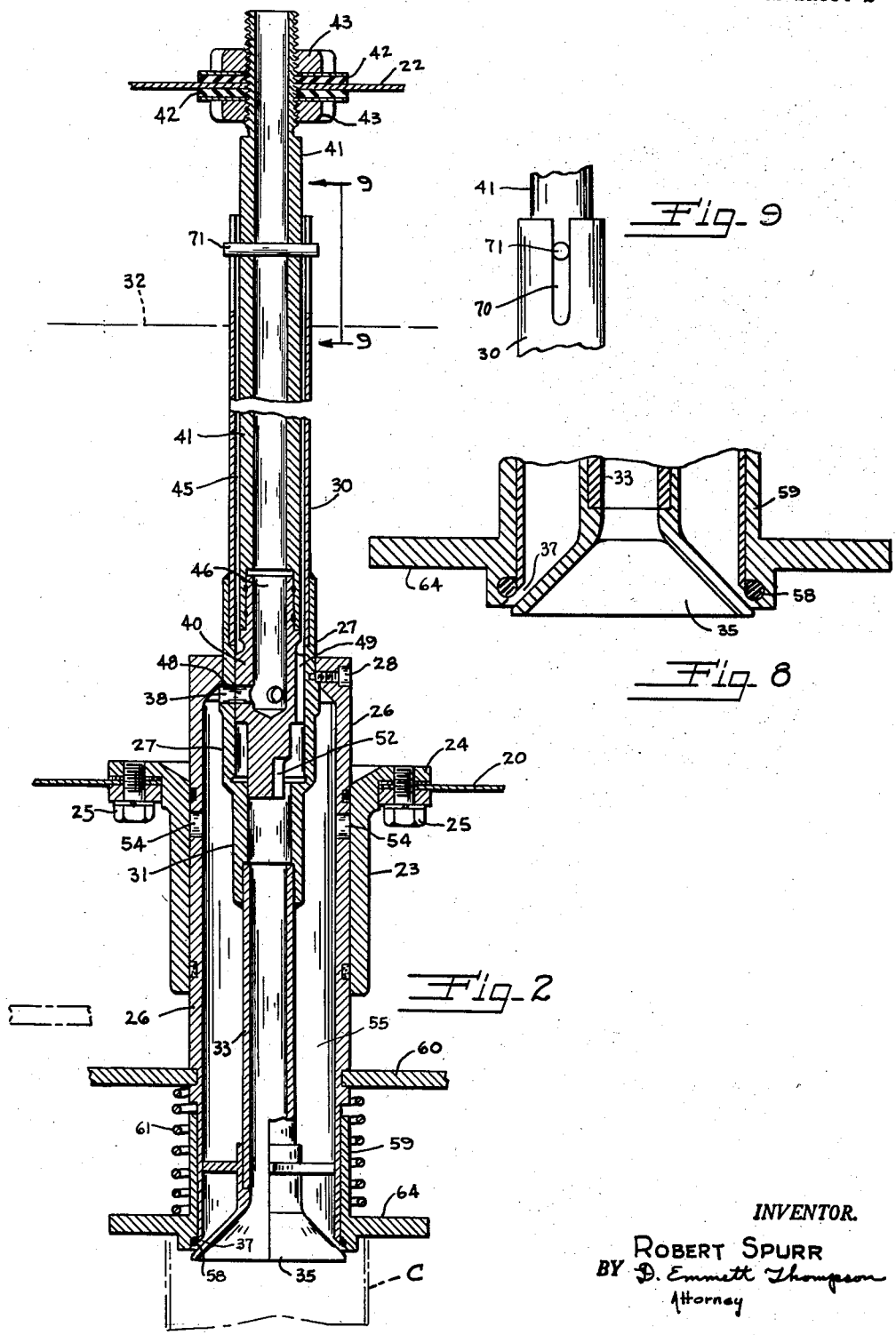

2,882,936

LIQUID DISPENSING APPARATUS

Robert Spurr, West Hartford, Conn., assignor to Sealright-Oswego Falls Corporation, Fulton, N.Y., a corporation of New York Application May 9, 1957, Serial No. 658,196

4 Claims. (Cl. 141—59)

This invention relates to liquid dispensing apparatus and particularly to apparatus for dispensing liquid into containers formed of non-rigid material, such as paperboard.

At the present time, paperboard containers are used extensively in packaging liquid food products, such as milk. It is required that an exact predetermined quantity of liquid be dispensed in containers of this type. Containers formed of rigid material, such as glass, are filled with apparatus known as vacuum fillers. In vacuum fillers, the dispensing portion of the apparatus that enters the upper portion of the container, for a short distance, has a tube connected to a source of vacuum whereby, when the container is filled, the surface of the liquid content engages the lower end of the vacuum tube and any excess amount of liquid dispensed in the container is siphoned off. Accordingly, it is a relatively easy matter to control the exact amount of liquid in a container of a given size.

The vacuum type filling apparatus also has the advantage in that the liquid may be dispensed rapidly in the container and with such products, as milk having the property of creating a great deal of foam or froth, this is of material importance.

At the present time, large quantities of milk are packaged in containers formed of paperboard which can not be used with conventional vacuum filling apparatus due to the fact that the vacuum applied causes the side walls of the flexible container to bulge inwardly, thereby reducing the cubical content of the container and resulting in the container not having a sufficient amount of liquid dispensed into it. This results in the liquid heretofore being dispensed into the paperboard containers by a metering type dispensing apparatus. In that arrangement, the liquid, or milk, is transferred into a measuring chamber, or compartment, and then it is permitted to flow by gravity into the container, or the liquid is expelled from the measuring chamber under slight pressure. Metering apparatus has been developed with improved structural arrangements for minimizing the foaming of the milk discharged into the open paperboard containers, as disclosed in Patent No. 2,666,565, issued January 19, 1954, to A. A. Barnes et al. However, such apparatus does not possess all the advantages of a vacuum type filler.

This invention has an an object a liquid dispensing apparatus of the metering type and wherein the tank or receptacle containing the supply of liquid is connected to a source of low vacuum, the apparatus functioning in the manner of a vacuum filler in that it automatically determines the amount of liquid dispensed, or ultimately dispensed, into the container, the arrangement being such that the vacuum supplied to the upper area of the tank, or supply reservoir, is only sufficient to remove excess liquid dispensed in the container.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view, with parts shown in elevation, of a dispensing apparatus embodying my invention.

Figure 2 is a view, similar to Figure 1, with the valve mechanism of the apparatus actuated to the open position for the dispensing of liquids into the container.

Figure 3 is a transverse sectional view taken on line 3—3, Figure 1.

Figure 4 is a transverse sectional view taken on line 4—4, Figure 1.

Figure 5 is a transverse sectional view taken on line 5—5, Figure 1.

Figure 6 is a transverse sectional view taken on line 6—6, Figure 1.

Figure 7 is a transverse sectional view taken on line 7—7, Figure 1.

Figure 8 is an enlarged sectional view of the lower portion of the apparatus shown in Figure 2.

Figure 9 is a fragmentary side elevational view taken on a line corresponding to line 9—9, Figure 1.

Referring to the drawings, 20 designates the bottom wall of a closed tank, or supply receptacle, and 22 indicates the top wall of the tank having a connection 21 to a source of low vacuum. A sleeve 23 is mounted in the bottom wall 20, the sleeve having a flange 24 at its upper end overlying the marginal surface about the aperture in which the sleeve is mounted. A suitable gasket is inserted between the flange and the bottom wall of the tank, and the assembly is secured together in liquid tight relation, as by cap screws 25. A tubular member 26 carrying an annular gasket 24' about its lower end is slidably mounted in the sleeve 23, the member 26 being open at its lower end and being formed at its upper end with a bore to snugly receive the intermediate portion 27 of a vertically disposed stem structure, the latter being detachably secured to the tubular member 26, as by set screw 28. This stem structure includes a tube 30 fixedly secured to the portion 27 and extending upwardly a distance beyond the liquid level in the tank, as indicated by the dotted line 32. A tube 33 extends downwardly from the portion 27 and is provided at its lower end with a conical valve member 35 and having a spider member 36 engaging the bore of the tubular member 26 and serving to properly center the valve member 35. The periphery of the base portion of the conical valve is spaced downwardly from the lower end of the tubular member 26 to provide an annular discharge opening 37, Figures 2 and 8.

The intermediate portion 27 of the stem structure is formed with a vent port 38 positioned immediately below the closed top of the tube 26, and the portion 27 is formed with a cylindrical bore to slidably receive a valve member 40 attached to the lower end of a hollow stem 41, the upper end of which extends through the top wall 22 of the closed tank communicating with atmosphere. The stem 41 is fixedly secured in air tight relation to the top wall 22 of the tank by gaskets 42 and nuts 43, whereby the valve member 40 is fixed against movement relative to the tank. The hollow stem 41 is somewhat less in diameter than the upper tube 30 of the first stem structure, thereby providing an axially extending annular passage 45 between the members 30, 41.

The valve 40 is formed in its upper portion with an axially extending passage 46 communicating with the interior of the member 41, and the valve member is also formed with a plurality of circumferentially spaced apart ports 48, and a plurality of axially extending grooves 49. The valve 40 is also formed, in its periphery, with a circumferentially extending groove 50. The lower portion of the valve 40 is of reduced diameter and is slidably mounted in the lower part 31 of the portion 27 of the first stem structure, and this lower portion of the valve is formed with a plurality of axially extending grooves 52.

The tubular member 26 is formed with a plurality of circumferentially spaced apart inlet ports 54. These ports 54 are positioned above the upper end of the sleeve 23 when the dispensing mechanism is closed, as shown in Figure 1. At this time, the liquid in the tank is permitted to flow through the inlet ports 54 and into the measuring chamber which consists of the annular space 55 between the first stem structure carrying the valve 35 and the tubular member 26. With the parts in this position, the conical valve 35 is engaged by a sealing ring 58 mounted in the inner surface of a valve sleeve 59 slidably mounted on the lower end portion of the tubular member 26. The valve sleeve 59 is yieldingly held in this closed position by a compression spring 61. This measuring chamber is vented by permitting air therein to escape through the port 38 which, at this time, is in registration with the groove 50 in valve member 40, the air passing upwardly through the passage 45 to the space in the top of the tank above the liquid level line 32. A source of low pressure vacuum is connected to this upper area of the tank, whereby the measuring, or metering, chamber is rapidly vented to permit the liquid to quickly fill the chamber.

In operation, the tubular member 26 is moved downwardly by actuating mechanism, not shown, engaging a collar 60 fixedly secured to the member 26. This downward movement effects shifting of the inlet ports 54 below the top of the sleeve 23, as indicated in Figure 2. The valve sleeve 59 is then moved upwardly by the filler actuating mechanism, moving the sealing ring 58 away from the conical valve member 35, thereby providing the annular passage 37 between the valve member 35 and the lower end of the tubular member 26, as illustrated in Figures 2 and 8. At this time, the container C is moved upwardly so that the upper edge thereof is in engagement with a collar 64 carried by the valve sleeve 59.

With the parts thus positioned, the liquid is permitted to discharge from the measuring chamber 55 into the container C, the chamber being vented via the ports 38, 48, and tubular member 41. Vacuum is connected to the hollow stem 33 due to the fact that the lower portion of the valve member 40 is partially positioned out of the bore of the lower portion 31 of the member 27 providing communication from the hollow stem 33, grooves 52, grooves 49, passage 45. Accordingly, when the top surface of the liquid dispensed into the container C reaches the bottom of the conical valve 35, any additional liquid will be drawn upwardly through the stem 33 and delivered to the tank above the liquid level 32, this being effected to remove any froth or foam accumulated on the surface of the liquid during the dispensing of the same into the container from the metering compartment.

When the container has been filled, the valve sleeve 59 is lowered to close the discharge passage 37 and the container is simultaneously moved downwardly to a distance below the valve structure, and the tubular member 26 is elevated to the position shown in Figure 1 for the refilling of the measuring chamber.

The upper end portion of the tube 30 is formed with diametrically disposed axially extending slots 70 for engagement with a pin 71 extending transversely of the tube 41. This arrangement, while permitting sliding movement of the tube 30, prevents relative rotation between the tube 41 and the valve member 40 carried thereby and the members 26, 27, so that the various parts in these members will not get out of alignment.

What I claim is:

1. Container filling apparatus comprising a closed liquid supply tank connected to a source of low vacuum, the bottom wall of said tank having a depending sleeve portion, a vertically disposed tubular member slidably mounted in liquid tight relation in said sleeve portion, said tubular member being closed at its upper end and open at its lower end, a hollow stem fixedly mounted in said tubular member and having a conical head portion spaced downwardly from the lower end of said tubular member to form an annular discharge passage, the lower portion of said stem being arranged in spaced concentric relation to the tubular member and extending upwardly through the closed end thereof and the upper portion of said stem terminating above the level of the liquid in the supply tank, a second tubular member positioned in spaced concentric relation within the upper portion of said stem and being fixed against axial movement in relation to the stem and said first tubular member, said second tubular member having a valve portion at its lower end, said first tubular member having an inlet port movable into and out of communication with the interior of the tank upon vertical reciprocation of said member for the admission of liquid in the space between the lower portion of the stem and said member when the latter is in its up position, said stem having an air vent port arranged in proximity to the upper end of said first tubular member, said valve portion being operable upon reciprocation of said first tubular member to alternately connect said vent port with the interior of the second tubular member and the space between said member and the upper portion of said stem, and to alternately connect and disconnect the passage in the lower portion of said stem with the space between the upper portion thereof and said second tubular member, and an annular member slidably mounted upon the lower portion of said first tubular member, and means yieldingly urging said annular member downwardly into engagement with the head portion of the stem to close said annular discharge passage.

2. Container filling apparatus comprising a closed liquid supply tank connected to a source of low vacuum, the bottom wall of the tank having a depending sleeve portion, a tubular member slidably mounted in liquid tight relation in said sleeve portion, the lower end of said member being open and the upper end being closed, a hollow stem fixedly secured to said tubular member, the lower portion of the stem being positioned in said member in concentrically spaced relation thereto to provide a measuring chamber, said stem having a conical head portion spaced downwardly from the lower end of said tubular member to form an annular discharge passage for said measuring chamber, said stem extending upwardly from the closed end of said tubular member and terminating above the liquid level in the tank, a second hollow stem depending from the top wall of the tank and being fixedly secured thereto with the upper end of the stem communicating with the atmosphere, said second stem being positioned in the first stem in concentrically spaced relation thereto to provide a vent passage communicating with the upper portion of the tank, said tubular member having an inlet port movable into and out of communication with the interior of the tank upon vertical reciprocation of said member, said first stem having a vent port communicating with the upper end of the measuring chamber, said second stem being provided at its lower end with a valve portion operable upon reciprocation of said tubular member to connect and disconnect the passage in the lower portion of said first stem with the vent passage between the upper portions of said stems and the interior of said second stem.

3. A low vacuum apparatus for filling containers comprising a closed liquid supply tank connected to a source of low vacuum, a tubular member mounted in the bottom wall of the tank, said tubular member depending from said bottom wall and extending upwardly therefrom and having vertical sliding movement in said bottom wall, the upper end of said tubular member being closed, a hollow stem fixedly mounted in said upper closed end of said tubular member, the upper end of said stem extending above the liquid level in said tank, a conical valve member secured to the lower end of said stem and being positioned downwardly in spaced relation to the lower end of said tubular member to provide an annular discharge passage, a valve sleeve slidably mounted on the lower end of said tubular member and normally closing said discharge passage and being movable upwardly to open said passage, said tubular member being formed with an inlet port normally communicating with the interior of the tank to permit the flow of liquid into said tubular member, said stem having a vent port positioned in adjacency to the upper closed end of the tubular member, a second hollow stem mounted within the upper portion of said first stem, said second stem being fixedly secured to the top wall of said tank and communicating at its upper end to atmosphere, said tubular member being movable downwardly to close said inlet port and to connect the vent port in said first stem with the interior of said second stem for the discharge of liquid through said discharge passage.

4. A low vacuum container filling apparatus comprising a closed liquid supply tank, the upper portion thereof being connected to a source of vacuum, a tubular member slidably mounted in the bottom of the tank and depending therefrom in liquid tight relation, a discharge valve structure carried at the lower end of said tubular member, means operable upon upward movement of said tubular member to connect the interior thereof with the interior of said supply tank and to apply vacuum to the upper portion of said tubular member, means operable upon downward movement of said tubular member to connect the interior thereof to atmosphere for the discharge of liquid from within said tubular member.

References Cited in the file of this patent

UNITED STATES PATENTS

| | | |
|---|---|---|
| 668,303 | Beyer | Feb. 19, 1901 |
| 2,711,279 | Day et al. | June 21, 1955 |
| 2,746,663 | Day et al. | May 22, 1956 |